(12) United States Patent
Hanes

(10) Patent No.: US 9,595,289 B2
(45) Date of Patent: Mar. 14, 2017

(54) PROVIDING DEVICE-LEVEL FUNCTIONALITY WITHOUT ALTERING INSTRUCTIONS STORED IN DEVICE MEMORY

(75) Inventor: David H. Hanes, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1039 days.

(21) Appl. No.: 12/834,567

(22) Filed: Jul. 12, 2010

(65) Prior Publication Data

US 2012/0008472 A1 Jan. 12, 2012

(51) Int. Cl.
*G11B 19/02* (2006.01)
*H04N 7/00* (2011.01)

(52) U.S. Cl.
CPC .......... *G11B 19/02* (2013.01); *H04N 7/00* (2013.01)

(58) Field of Classification Search
None
See application file for complete search history.

(56) References Cited

U.S. PATENT DOCUMENTS

| | | | |
|---|---|---|---|
| 7,606,127 B2 | 10/2009 | Erickson et al. | |
| 2007/0212026 A1* | 9/2007 | Herpel | G06F 8/64 386/247 |
| 2008/0219111 A1 | 9/2008 | Van Rompaey et al. | |
| 2008/0232200 A1 | 9/2008 | Lee | |
| 2008/0285961 A1 | 11/2008 | Ostrover et al. | |
| 2008/0301358 A1 | 12/2008 | Wen et al. | |
| 2009/0097397 A1* | 4/2009 | Moreira Sa de Souza | H04L 41/0636 370/216 |
| 2009/0274451 A1 | 11/2009 | Eklund, II | |
| 2010/0188767 A1* | 7/2010 | Hirose | G11B 5/09 360/31 |

OTHER PUBLICATIONS

Application Definition Blu-ray Disc Format, BD-J Baseline Application and Logical Model Definition for BD-ROM, Mar. 2005, http://www.bluraydisc.com/Assets/Downloadablefile/2b_bdrom_audiovisualapplication_0305-12955-15269.pdf.

* cited by examiner

*Primary Examiner* — Jennifer Mehmood
*Assistant Examiner* — Carl Adams
(74) *Attorney, Agent, or Firm* — Brooks Cameron & Huebsch PLLC

(57) ABSTRACT

Systems, methods, and machine-readable media provide device-level functionality without altering device memory. A non-transitory machine-readable medium can store a first set of instructions that are executed by the machine to provide device-level functionality unsupported by a second set of instructions stored in device memory associated with the machine without altering the second set of instructions stored in the device memory. For example, the machine can be an optical disc player and the medium can be an optical disc.

15 Claims, 3 Drawing Sheets

Figure 1:
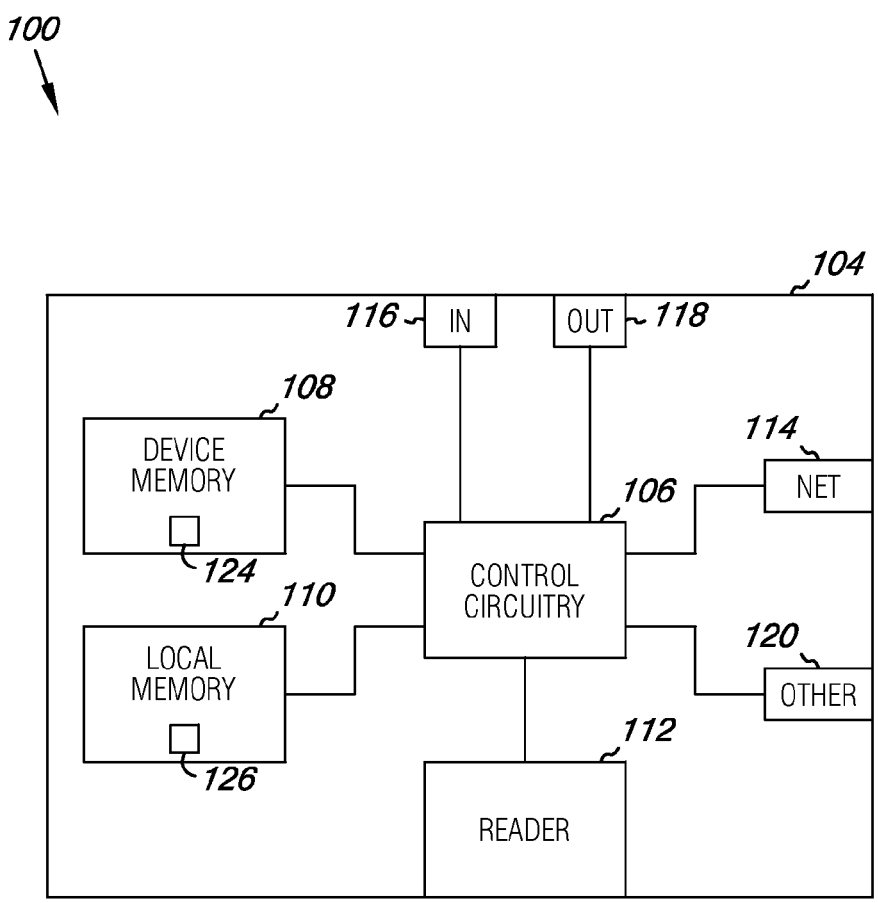
Figure 1:
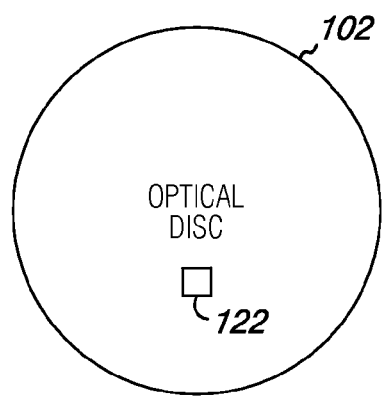

PROVIDING DEVICE-LEVEL FUNCTIONALITY WITHOUT ALTERING INSTRUCTIONS STORED IN DEVICE MEMORY

BACKGROUND

Optical disc players (e.g., DVD, Blu-ray, HD-DVD, etc.) can provide a number of functions including playing movies stored on optical discs. Optical disc players have largely replaced magnetic tape players as a source of home entertainment video playback. Such players may continue to grow in popularity as prices decrease. However, decreasing prices may increase pressures on reducing the cost of manufacturing the optical disc players themselves.

Some optical disc players include device memory associated therewith. The device memory can include non-volatile memory, for example, electrically erasable programmable read-only memory (EEPROM). The device memory can store instructions (e.g., firmware) for providing device-level functionality to the optical disc player. Instructions stored in the device memory can be altered to provide for new device-level functionality (e.g., features) not supported by a prior version of the instructions stored in the device memory.

The instructions stored in the device memory may be provided by the optical disc player manufacturer. When new device-level functionality is desired for a particular model of optical disc player, the manufacturer may incur the costs of developing altered instructions for the device memory including, in some instances, writing and testing the instructions for a number of different models of optical disc players. That is, different manufacturers may have different versions of the instructions stored in device memory to provide device-level functionality, even where the device-level functionality is the same between different manufacturers (e.g., the functionality of playing a Blu-ray disc).

BRIEF DESCRIPTION OF THE DRAWINGS

FIG. 1 is a block diagram illustrating an example of a system for providing device-level functionality without altering instructions stored in device memory according to the present disclosure.

FIG. 2 is a block diagram illustrating an example of a non-transitory machine-readable medium storing instructions that are executed by the machine to provide device-level functionality without altering instructions stored in device memory according to the present disclosure.

FIG. 3 provides a flow chart illustrating an example of a method for providing device-level functionality without altering instructions stored in device memory according to the present disclosure.

DETAILED DESCRIPTION

Systems, methods, and machine-readable media provide device-level functionality without altering device memory. A non-transitory machine-readable medium can store a first set of instructions that are executed by the machine to provide device-level functionality unsupported by a second set of instructions stored in device memory associated with the machine without altering the second set of instructions stored in the device memory. For example, the machine can be an optical disc player and the medium can be an optical disc.

It can be beneficial to add new device-level functionality (e.g., features) to an optical disc player without having to incur the costs of altering the instructions stored in device memory (e.g., firmware) and the costs incurred during testing of the altered instructions (e.g., whether the altered instructions cause any unintended changes to previously supported device-level functionality). According to some examples of the present disclosure, new device-level functionality can be provided to an optical disc player (e.g., a Blu-ray player) by inserting a special optical disc (e.g., a Blu-ray disc) that includes instructions that enable the new device-level functionality.

As used herein, "device-level functionality," is distinguished from application-based functionality. Device-level functionality is akin to a high-level feature, for example, providing an ability for the optical disc player to stream movies from an online provider of such media, providing an ability for the optical disc player to serve as a Universal Plug and Play (UPnP) receiver for receiving and displaying, playing, etc., media from another electronic device connected to the optical disc player by a network. Such media can include pictures, videos, audio files, etc., as stored on a computing device, for example. In general, device-level functionality can be equated with functionality that, according to previous approaches, required a firmware upgrade.

Application-based functionality, conversely, is functionality provided by a set of executed instructions using features already enabled by the instructions stored in the device memory (e.g., firmware). Examples of such application-based functionality can include games stored on Blu-ray discs that accompany a movie also stored on the Blu-ray disc, playing modern movie trailers on aged movie Blu-ray discs (e.g., where the Blu-ray disc includes instructions to connect to a movie studio website to play recent trailers rather than copies of movie trailers stored on the Blu-ray disc at the time of creation of the disc), etc.

This previous example of playing modern movie trailers can further define the difference between device-level functionality and application-based functionality. If the Blu-ray player, though instructions stored on the device memory, includes device-level functionality for opening an Internet connection, downloading content therefrom, and playing the content, then the Blu-ray disc storing instructions to connect to a particular movie studio's website to download modern trailers can be described as application-based functionality. However, if the Blu-ray disc player does not include an ability to open an Internet connection, etc., then, according to some examples of the present disclosure, instructions stored on a EN-ray disc can provide such functionality and can be described as providing device-level functionality. In some examples, providing device-level functionality can include providing an ability for the machine (e.g., Blu-ray player) to perform a function or enable a feature not previously available to the machine, whereas providing application-level functionality can include executing a set of instructions to perform an operation (the machine previously having the ability to execute the instructions and perform the operation, but for having those particular instructions to execute).

Furthermore, according to some previous approaches, new device-level functionality could be provided to an optical disc player by altering the instructions stored in device memory (e.g., by replacing the instructions stored in device memory with an updated set of instructions from an optical disc). That is, device firmware could be updated using an optical disc. Examples of the present disclosure are also distinguished from these previous approaches, because, according to the present disclosure, new device-level functionality can be provided via instructions on an optical disc without altering the instructions stored in device memory (e.g., firmware).

In the following detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the embodiments of this disclosure, and it is to be understood that other examples may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

FIG. 1 is a block diagram illustrating an example of a system 100 for providing device-level functionality without altering instructions 124 stored in device memory 108 according to the present disclosure. The system 100 can include a non-transitory machine-readable medium (e.g., optical disc 102) storing first instructions 122. A non-transitory machine-readable medium, as used herein, can include volatile and/or non-volatile memory. Non-volatile memory can include memory that does not depend upon power to store information, while volatile can depend upon power in order to store information. Examples of non-volatile memory include, for example, optical discs such as Blu-ray discs, digital versatile discs (DVD), high definition digital versatile discs (HD DVD), compact discs (CD), laser discs, etc., magnetic media such as is associated with tape drives, floppy discs, and hard drives, solid state media such as flash memory, EEPROM, phase change random access memory (PCRAM), among other types of machine-readable media. Examples of volatile memory include various types of dynamic random access memory (DRAM), among others.

The system 100 can include a machine (e.g., optical disc player 104) such as a Blu-ray disc player. The optical disc player 104 can include control circuitry 106 such as a processor, logic embedded in an application specific integrated circuit (ASIC), a controller, and the like. As used herein, the indefinite articles "a" and/or "an" can indicate one or more than one of the named object. Thus, for example, "a processor" can include one processor or more than one processor, such as a parallel processing system. Likewise, "an ASIC" can include one or more than one ASIC. The control circuitry 106 can execute instructions to and/or be configured to (e.g., in the case of logic) provide functionality to the optical disc player 104 as described herein.

The control circuitry 106 can be coupled to device memory 108 (e.g., non-volatile memory). Device memory 108 can store second instructions 124 (e.g., firmware) executed by the control circuitry 106 to provide device-level functionality to the optical disc player 104. In general, the device memory 108 may be largely inaccessible to applications 126 that are run in local memory 110 (e.g., via instructions stored in an optical disc 102 and read by an optical disc reader 112).

The control circuitry 106 can be coupled to local memory 110 (e.g., volatile memory) to provide a memory resource for applications executed by the control circuitry 106. Various instructions executed by the optical disc player 104 (e.g., by control circuitry 106) can be run in local memory 110 (e.g., instructions can be executed to run an application 126 in local memory 110). According to some examples of the present disclosure, the first instructions 122 can be executed by the machine 104 and run in local memory 110 associated with the machine 104 to provide device-level functionality.

The control circuitry 106 can be coupled to an optical disc reader 112 (e.g., a Blu-ray disc reader) to communicatively couple with the optical disc 102 and receive first instructions 122 therefrom. The optical disc reader 112 can include an optical head (e.g., a laser) for reading the optical disc 102. In some examples, the first instructions 122 are executed by the machine 104 to provide the device-level functionality while the optical disc 102 is communicatively coupled to the machine 104, but the machine 104 can lose the device-level functionality provided by the first instructions 122 after the optical disc 102 is communicatively decoupled (e.g., removed) from the machine 104.

Accordingly, some examples of the present disclosure can provide additional device-level functionality to a machine 104 via first instructions stored on an optical disc 102 while the optical disc 102 is in the machine 104. Many users may prefer to interact with one type of media at a time (e.g., a user may not wish to watch a Blu-ray movie off of a Blu-ray disc while using the Blu-ray disc player to provide other functionality such as playing music files off of a networked computing device simultaneously with viewing the movie).

The control circuitry 106 can be coupled to a wired and/or wireless network interface 114 (e.g., "NET"). For example, the network interface 114 can be a physical Ethernet port and/or an 802.11 wireless local area network (WLAN) interface. As described herein, in some embodiments, the optical disc player 104 can be connected to a network for additional functionality.

The control circuitry 106 can be coupled to an input port 116 and/or an output port 118. Examples of input ports 116 and/or output ports 118 include a number of audio-visual connections including high definition multimedia interface (HDMI), digital visual interface (DVI), coaxial, component, composite, optical digital jack, peripheral component interconnect (PCI), and/or wired or wireless ports for remote control devices, among others. The control circuitry 106 can be coupled to other input and/or output ports 120 such as universal serial bus (USB) and IEEE 1394 ports, among others. Examples of the present disclosure are not limited to the particular arrangement or number of connections illustrated in FIG. 1. Although the input ports 116 and output ports 118 are illustrated as separate ports, in some examples, the input ports 116 and output ports 118 can be a same physical port.

In an example of the present disclosure, the optical disc 102 can be a Blu-ray disc, the optical disc player 104 can be Blu-ray disc player, and the optical disc reader 112 can be a Blu-ray disc reader. The Blu-ray disc 102 can store instructions 122 that are read by the Blu-ray disc reader 112 and executed by the control circuitry 106 to run a Blu-ray compliant Java application 126 in the local memory 110. For example, the first instructions 122 can be Java 2 Micro Edition (J2ME) instructions. The Java application can provide device-level functionality to the Blu-ray disc player 104 that is unsupported by the instructions 124 stored in the device memory 108. As described herein, the Java application 126 can provide the device-level functionality without altering the instructions 124 stored in the device memory 108.

In an example of the present disclosure, the machine 104 can be a Blu-ray disc player that is connected (e.g., via input ports 116, output ports 118, network connection 114, and/or other input/output ports 120) to a user's television, stereo, and home network. The user may have various media stored on a separate computing device such as a laptop computer, desktop computer, etc. The second instructions 124 stored on the device memory 108 may not provide device-level functionality for the Blu-ray disc player 104 to function as a Universal Plug and Play (UPnP) receiver. For the example described, UPnP receiver functionality would allow the Blu-ray disc player 104 to playback media such as photos, music, and videos that are stored on the user's separate computing device. Rather than providing alternate second instructions 124 (e.g., firmware) to support UPnP functionality, first instructions 122 stored on a Blu-ray disc 102 can be provided to support UPnP functionality when the Blu-ray disc 102 including the first instructions 122 is inserted into the Blu-ray disc reader 112 and the first instructions 122 are executed by the control circuitry 106 and run in local memory 110.

Such a set of first instructions 122 can be more cost effective to provide than a respective set of altered second set of instructions 124, because not having to update the second instructions 124 can relieve the potential for generating errors with other device-level functionality provided by the second instructions 124. Furthermore, the first instructions 122 and the device-level functionality provided thereby can be machine 104 manufacturer independent such that the instructions are executable on a Blu-ray disc player 104 provided by any manufacturer. For example, as described herein, Blu-ray disc players 104 are generally provided with a Java application layer capable of providing a Java compliant application interface. Such examples can be beneficial in allowing a wide customer base for the first instructions 122 stored on the optical disc 102. That is, a developer of the first instructions 122 can produce one version of the optical disc 102 for potentially all machine 104 owners without altering the second instructions 124 (e.g., updating the firmware of the machine 104).

Additionally, although the first instructions 122 and the device-level functionality provided thereby can be machine 104 manufacturer independent, additional first instructions 122 can be provided that, when executed by the control circuitry 106, restrict the provision of the device-level functionality dependent upon a particular machine 104 manufacturer. Such examples can be beneficial for a developer of the first instructions 122 that desires to create optical discs 102 that, for example, only work with machines 104 of the developer's choosing to give the developer a competitive advantage relative to other developers (e.g., new and/or existing users may decide to buy a particular machine 104 that is provided with the relevant first instructions 122 rather than waiting for other developers to provide similar first instructions 122 for other machines 104). Restricting the provision of the device-level functionality dependent upon a particular manufacturer, but not a particular model from the manufacturer, can provide the manufacturer with an ability to provide the device-level functionality across the manufacturer's entire line of the machine 104. However, some examples of the present disclosure can include additional first instructions 122 can be provided that, when executed by the control circuitry 106, restrict the provision of the device-level functionality dependent upon a particular model of the machine 104 (e.g., even for different models provided by a same manufacturer).

In some examples, the first instructions 122 can be executed to identify a machine 104 identifier and determine the particular machine manufacturer and/or model according to the machine 104 identifier. For example, the machine 104 identifier can be a hardware address of the machine 104, or another identifier that provides an indication of the manufacturer and/or model of the machine 104.

Figure 2:
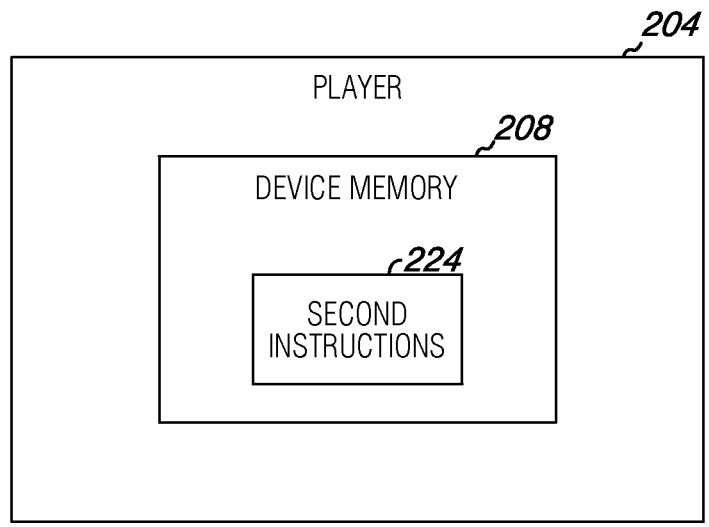
Figure 2:
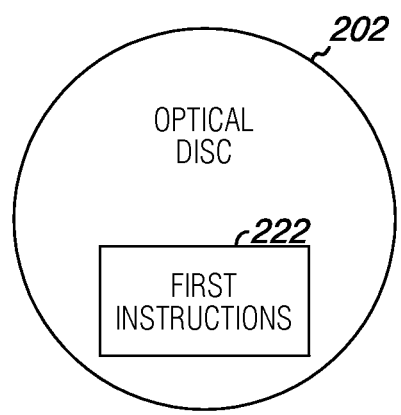

FIG. 2 is a block diagram illustrating an example of a non-transitory machine-readable medium 202 storing instructions 222 that are executed by the machine 204 to provide device-level functionality without altering instructions 224 stored in device memory 208 according to the present disclosure. The first instructions 222 can be executed by the machine 204 to provide device-level functionality unsupported by the second instructions 224 stored in device memory 208 associated with the machine 204 without altering the second instructions 224 stored in the device memory 208. For example, the machine 204 can be an optical disc player (e.g., a Blu-ray disc player) and the medium 202 can be an optical disc (e.g., a Blu-ray disc).

Blu-ray disc players 204 are generally provided with a Java application layer capable of providing a Java compliant application interface. Blu-ray disc players 204 can include a fully programmable application environment with network connectivity based on a platform that is compliant with J2ME Personal Basis Profile (PBP) Java platform and the Globally Executable Multimedia (GEM) Home Platform (MHP) specification. Java is a platform independent programming environment. The Java compliant application interface can support local storage and Internet connectivity. The Java compliant application can be controlled by control circuitry of the Blu-ray disc player as described herein. Once the Java compliant application has ceased running (e.g., in local memory), any resources allocated to it (e.g., local memory and audio/visual control) can be released (e.g., as opposed to previous approaches to providing device-level functionality that update machine firmware and are thus retained by the machine).

Figure 3:
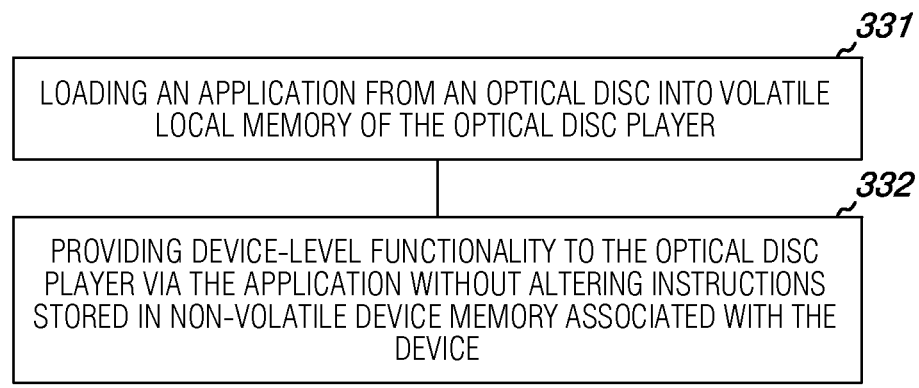

FIG. 3 provides a flow chart illustrating an example of a method for providing device-level functionality without altering instructions stored in device memory according to the present disclosure. The method includes loading 331 an application from an optical disc into volatile local memory of the optical disc player. The method also includes providing 332 device-level functionality to the optical disc player via the application without altering instructions stored in non-volatile device memory associated with the device.

In some examples of the present disclosure, such a method can include running the application in the volatile local memory and accessing data stored on the optical disc while the application is running in the volatile local memory.

For example, providing device-level functionality according to such a method can include providing UPnP receiver functionality as described herein. Providing UPnP receiver functionality can include providing the optical disc player with an ability to output photograph files, audio files, and video files stored on a device external to the optical disc player and connected to the optical disc player via a network.

It is to be understood that the above description has been made in an illustrative fashion, and not a restrictive one. Although specific examples have been illustrated and described herein, other component arrangements can be substituted for the specific examples shown.

What is claimed:

1. A non-transitory machine-readable medium storing first instructions that are executed by the machine to:
provide device-level functionality unsupported by second instructions that provide device-level functionality to the machine and that are stored in non-volatile memory associated with the machine without altering the second instructions in the non-volatile memory and without altering the second instructions in volatile memory associated with the machine;
wherein the machine comprises an optical disc player and the medium comprises an optical disc.

2. The medium of claim 1, wherein the first instructions are executed by the machine and run in the volatile memory associated with the machine to provide the device-level functionality.

3. The medium of claim 1, wherein the medium comprises a Blu-ray disc, the first instructions comprise Java 2 Micro Edition (J2ME) instructions, the second instructions comprise firmware, and the machine comprises a Blu-ray disc player.

4. The medium of claim 3, wherein the first instructions are executed to run a Blu-ray compliant Java application in the volatile memory associated with the machine.

5. The medium of claim 4, wherein the device-level functionality comprises Universal Plug and Play (UPnP) receiver functionality.

6. The medium of claim 1, wherein the first instructions are executed by the machine to provide the device-level functionality while the medium is communicatively coupled to the machine; and
wherein the machine loses the device-level functionality after the medium is communicatively decoupled from the machine.

7. The medium of claim 1, wherein the first instructions and the device-level functionality are machine manufacturer independent.

8. The medium of claim 7, wherein the first instructions are executed to restrict the provision of the device-level functionality dependent upon a particular machine manufacturer.

9. The medium of claim 8, wherein the first instructions are executed to identify a machine identifier and determine the particular machine manufacturer according to the machine identifier.

10. An optical disc player implemented method, comprising:
loading an application from an optical disc into volatile local memory of the optical disc player; and
providing device-level functionality to the optical disc player via the application without altering instructions stored in non-volatile memory and without altering instructions stored in volatile memory of the optical disc player that provide device-level functionality to the optical disc player, wherein the device-level functionality provided via the application is unsupported by the instructions stored in the non-volatile memory.

11. The method of claim 10, wherein the method includes:
running the application in the volatile memory; and
accessing data stored on the optical disc while the application is running in the volatile memory.

12. The method of claim 10, wherein providing device-level functionality includes providing Universal Plug and Play (UPnP) receiver functionality.

13. The method of claim 12, wherein providing UPnP receiver functionality includes providing the optical disc player with an ability to output photograph files, audio files, and video files stored on a device external to the optical disc player and connected to the optical disc player via a network.

14. A system, comprising:
a Blu-ray disc player including:
control circuitry;
a Blu-ray disc reader coupled to the control circuitry;
volatile memory coupled to the control circuitry to provide a memory resource for applications executed by the control circuitry; and
non-volatile memory coupled to the control circuitry storing instructions executed by the control circuitry to provide device-level functionality to the Blu-ray disc player; and
a Blu-ray disc storing instructions that are read by the Blu-ray disc reader and executed by the control circuitry to:
run a Blu-ray compliant Java application in the local memory;
wherein the Java application provides device-level functionality to the Blu-ray disc player that is unsupported by the instructions stored in the non-volatile memory; and
wherein the Java application provides the device-level functionality without altering the instructions stored in the volatile memory and without altering instructions stored in the non-volatile memory.

15. The system of claim 14, wherein the non-volatile memory stores firmware instructions.

* * * * *